(12) United States Patent
Kim

(10) Patent No.: US 8,325,350 B2
(45) Date of Patent: Dec. 4, 2012

(54) APPARATUS AND METHOD FOR MEASURING THREE-DIMENSIONAL SHAPE BY USING MULTI-WAVELENGTH

(75) Inventor: Min-Young Kim, Seoul (KR)

(73) Assignee: Koh Young Technology Inc., Seoul (KR)

( * ) Notice: Subject to any disclaimer, the term of this patent is extended or adjusted under 35 U.S.C. 154(b) by 531 days.

(21) Appl. No.: 12/575,755

(22) Filed: Oct. 8, 2009

(65) Prior Publication Data

US 2010/0091302 A1    Apr. 15, 2010

(30) Foreign Application Priority Data

Oct. 13, 2008  (KR) .......................... 10-2008-0099998

(51) Int. Cl.
  *G01B 11/24* (2006.01)
(52) U.S. Cl. ....................................... 356/603; 356/601
(58) Field of Classification Search .......... 356/601–613,
  356/614–624, 496, 237.2–237.6, 511–516,
  356/625–636; 250/559.22, 559.39, 559.01,
  250/559.19, 559.27, 559.25; 382/147, 154;
  348/49, 42, 46
  See application file for complete search history.

(56) References Cited

U.S. PATENT DOCUMENTS

| | | | |
|---|---|---|---|
| 6,421,629 B1 | 7/2002 | Ishiyama | |
| 2006/0082590 A1* | 4/2006 | Stevick et al. | ............... 345/587 |
| 2007/0177159 A1 | 8/2007 | Kim et al. | |
| 2007/0211259 A1* | 9/2007 | Jeon et al. | .................... 356/605 |
| 2007/0223805 A1 | 9/2007 | Jeon et al. | |
| 2009/0190139 A1 | 7/2009 | Fisher et al. | |

FOREIGN PATENT DOCUMENTS

| | | |
|---|---|---|
| CN | 2856928 Y | 1/2007 |
| CN | 101182996 A | 5/2008 |
| WO | 96/12160 | 4/1996 |

OTHER PUBLICATIONS

European Search Report for Application No. 09172738.8, dated Feb. 4, 2010.

* cited by examiner

*Primary Examiner* — Tri T Ton
(74) *Attorney, Agent, or Firm* — Kile Park Goekjian Reed & McManus PLLC

(57) ABSTRACT

An apparatus and a method for measuring a three-dimensional shape are disclosed. The apparatus includes a transfer stage, a first projector, a second projector, a camera unit and a control unit. The transfer stage transfers a measurement object to a measurement position. The first projector irradiates a first pattern light having a first equivalent wavelength toward the measurement object in a first direction. The second projector irradiates a second pattern light having a second equivalent wavelength that is different from the first equivalent wavelength toward the measurement object in a second direction. The camera unit takes a first pattern image that is generated when the first pattern light is reflected by the measurement object, and a second pattern image that is generated when the second pattern light is reflected by the measurement object. The control unit controls the first projector and the second projector, and obtains a three-dimensional shape of the measurement object through the first pattern image and the second pattern image.

23 Claims, 6 Drawing Sheets

APPARATUS AND METHOD FOR MEASURING THREE-DIMENSIONAL SHAPE BY USING MULTI-WAVELENGTH

CROSS REFERENCE TO RELATED APPLICATION

This application claims priority from and the benefit of Korean Patent Application No. 10-2008-0099998, filed on Oct. 13, 2008, which is hereby incorporated by reference for all purposes as if fully set forth herein.

BACKGROUND OF THE INVENTION

1. Field of the Invention

Exemplary embodiments of the present invention relate to an apparatus and method for measuring three-dimensional shape by using multi-wavelength. More particularly, exemplary of the present invention relate to an apparatus and method for measuring three-dimensional shape by using multi-wavelength.

2. Discussion of the Background

In a method for measuring three-dimensional shape of a measurement object, there is a method using projection of Moire pattern. According to the method using projection of Moire pattern, a three-dimensional shape of a measurement object is obtained using a pattern image formed when a pattern light is reflected by the measurement object. In the method for measuring three-dimensional shape of a measurement object by using a pattern image, there is a phase shifting method.

According to the phase shifting method, a plurality of pattern images of a measurement object according to interference signals, is obtained moving a reference surface, and the plurality of pattern images is analyzed considering a form of the interference signal and a height of a measurement point, to measure the three-dimensional shape of the measurement object. However, the phase shifting method has a problem of $2\pi$ ambiguity.

The $2\pi$ ambiguity happens when a height difference between two adjacent measurement points is greater than a multiple of an equivalent wavelength, so that a measurement range of a measurement object is limited according to a pitch of a grating.

Therefore, when a three-dimensional shape of a measurement object is measured according to the conventional phase shifting method, a grating should be changed to correspond to the measurement object due to the $2\pi$ ambiguity.

SUMMARY OF THE INVENTION

Exemplary embodiments of the present invention provide an apparatus and a method for measuring a three-dimensional shape, which are capable of increasing a maximum height of the measurement object, by measuring the three-dimensional shape of the measurement object by using multi-wavelength.

Exemplary embodiments of the present invention also provide an apparatus and a method for measuring a three-dimensional shape, which are capable of increasing a maximum height of the measurement object, obtaining warpage information of the measurement object and removing a shadow region by irradiating first and second pattern lights having different equivalent wavelength from each other onto the measurement object.

Additional features of the invention will be set forth in the description which follows, and in part will be apparent from the description, or may be learned by practice of the invention.

An exemplary embodiment of the present invention discloses an apparatus for measuring a three-dimensional shape. The apparatus includes a transfer stage, a first projector, a second projector, a camera unit and a control unit. The transfer stage transfers a measurement object to a measurement position. The first projector irradiates a first pattern light having a first equivalent wavelength toward the measurement object in a first direction. The second projector irradiates a second pattern light having a second equivalent wavelength that is different from the first equivalent wavelength toward the measurement object in a second direction. The camera unit takes a first pattern image that is generated when the first pattern light is reflected by the measurement object, and a second pattern image that is generated when the second pattern light is reflected by the measurement object. The control unit controls the first projector and the second projector, and measures a three-dimensional shape of the measurement object through the first pattern image and the second pattern image.

An exemplary embodiment of the present invention discloses a method for measuring a three-dimensional shape, includes obtaining a first phase through a plurality of first pattern images that is generated when a first pattern light having a first equivalent wavelength is reflected by a measurement object, while moving a first grating of a first projector, obtaining a second phase through a plurality of second pattern images that is generated when a second pattern light having a second equivalent wavelength different from the first equivalent wavelength is reflected by a measurement object, while moving a second grating of a second projector, obtaining a third phase using the first equivalent wavelength and the second equivalent wavelength, and obtaining a unified height information by using the first phase, the second phase and third phase.

According to the present invention, the apparatus and method are capable of increasing a maximum height of the measurement object, obtaining warpage information of the measurement object and removing a shadow region by irradiating first and second pattern lights having different equivalent wavelength from each other onto the measurement object.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
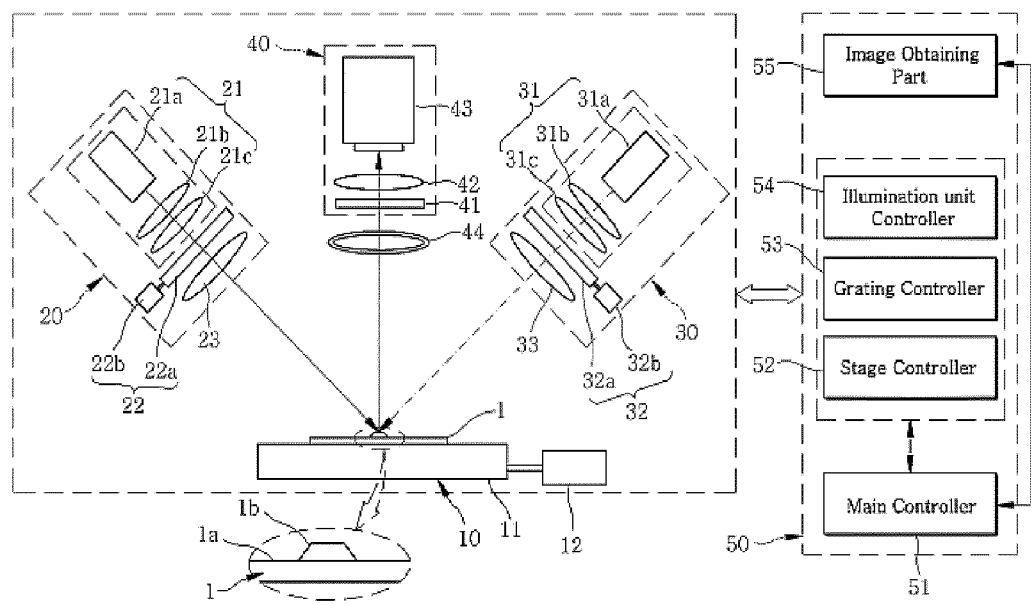
FIG. 1 is a diagram illustrating an apparatus for measuring three-dimensional shape by using multi-wavelength according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
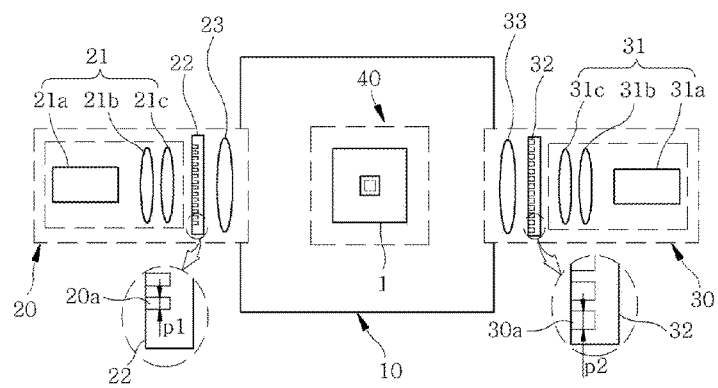
FIG. 2 is a plan view illustrating the apparatus in FIG. 1.

FIG. 1 is a diagram illustrating an apparatus for measuring three-dimensional shape by using multi-wavelength according to an exemplary embodiment of the present invention, and FIG. 2 is a plan view illustrating the apparatus in FIG. 1.

Referring to FIG. 1 and FIG. 2, an apparatus for measuring three-dimensional shape by using multi-wavelength according to an exemplary embodiment of the present invention includes a transfer stage 10, a first projector 20, a second projector 30, a camera unit 40 and a control unit 50.

The transfer stage 10 includes an X/Y stage 11 supporting a measurement object 1, and a stage transferrer 12 transferring the X/Y stage 11 in X/Y directions to move the measurement object 1 to a measurement position. The stage transferrer 12 transfers the X/Y stage 11 to move the measurement object 1 in X/Y directions according to a control of a stage controller 52 of the control unit 50.

The first projector 20 is disposed over and to the side of the transfer stage 10. The first projector 20 emits a first pattern light having a first equivalent wavelength toward the measurement object 1 in a first direction. The first projector 20 includes an illuminating unit 21, a first grating unit 22 and a condenser lens 23.

The illuminating unit 21 includes a light source 21a and lenses 21b and 21c to emit light. The first grating unit 22 receives the light from the illuminating unit 21 to transform the light into the first pattern light having the first equivalent wavelength. The first grating unit 22, which transforms the light from the illuminating unit 21 into the first pattern light, may employ one of a grating plate module 22a and 22b, a liquid crystal display and digital mirror. The grating plate module 22a and 22b includes a first grating 22a and a grating transferrer 22b. The first grating 22a has a plurality of first patterns 20a with a first pitch p1 as shown in FIG. 2 to transform the light into the first pattern light having the first equivalent wavelength. Instead of the grating plate module 22a and 22b, a liquid crystal display (not shown) may be employed. Alternatively a digital minor (not shown) including micro-mirrors with a reflecting surface and a light source unit irradiating light toward the micro-mirrors may be employed.

The grating transferrer 22b is connected to the first grating 22a to transfer the first grating 22a by a first distance. For example, the grating transferrer 22b may transfer the first grating 22a by a quarter of a first pitch p1 when a plurality of first patterns 20a of the first grating 22a has the first pitch p1. As described above, in order to transfer the first grating 22a minutely, a PZT (piezoelectric) actuator may be employed as the grating transferrer 22b. The condenser lens 23 is disposed at a lower portion of the first grating unit 22. The condenser lens 23 condenses the first pattern light toward the measurement object 1 in the first direction.

The second projector 30 is disposed over and to the side of the transfer stage 10 such that the second projector 30 is opposite to the first projector 20. The second projector 30 emits a second pattern light having a second equivalent wavelength that is different from the first equivalent wavelength toward the measurement object 1 in a second direction. The second projector 30 includes an illuminating unit 31, a second grating unit 32 and a condenser lens 33.

The illuminating unit 31 includes a light source 31a and lenses 31b and 31c to emit light. The light source 31a and the light source 21a of the first projector 20 may be the same. For example, when the light source 21a of the first projector 20 uses a light source emitting white light, the light source 31a of the second projector 30 also uses a light source emitting white light. The second grating unit 32 receives the light from the illuminating unit 31 to transform the light into the second pattern light having the second equivalent wavelength. The second grating unit 32, which transforms the light from the illuminating unit 31 into the second pattern light, includes a second grating 32a and a grating transferrer 32b.

The second grating 32a has a plurality of second patterns 30a with a second pitch p2 as shown in FIG. 2 to transform the light into the second pattern light having the second equivalent wavelength. The grating transferrer 32b is connected to the second grating 32a to transfer the second grating 32a by a second distance. For example, the grating transferrer 32b may transfer the second grating 32a by a quarter of a second pitch p2 when a plurality of second patterns 30a of the second grating 32a has the second pitch p2. As described above, in order to transfer the second grating 32a minutely, a PZT (piezoelectric) actuator may be employed as the grating transferrer 32b. The condenser lens 33 is disposed at a lower portion of the second grating unit 32. The condenser lens 33 condenses the second pattern light toward the measurement object 1 in the second direction.

The camera unit 40 is disposed over the transfer stage 10 to take a first pattern image that is generated when the first pattern light is reflected by the measurement object 1 and a second pattern image that is generated when the second pattern light is reflected by the measurement object 1, sequentially. The camera unit 40 taking the first pattern image and the second pattern image includes a filter 41, an image forming lens 42 and a camera 43.

The filter 41 filters the first and second pattern images reflected by the measurement object 1. For example, a frequency filter, a color filter, an intensity-adjusting filter, etc. may be employed as the filter 41. The image forming lens 42 is disposed over the filter 41 to receive the first and second pattern images filtered by the filter 41 and forms an image. The camera 43 is disposed over the image forming lens 42 to take the first and second pattern images formed by the image forming lens 42. For example, a CCD camera or a CMOS camera may be employed as the camera 43. The camera unit 40 may further include a two-dimensional inspection illuminating unit 44 for two-dimensional inspection. The two-dimensional inspection illuminating unit 44 may include a plurality of light-emitting diode or a circular lamp. The two-dimensional inspection illuminating unit 44 may be used for two-dimensional filming or filming for a specific shape.

The control unit 50 controls the first projector 20 and the second projector 30, respectively such that the first pattern light or the second pattern light is irradiated onto the measurement object 1 in the first direction or in the second direction, and the control unit 50 receives the first pattern image or the second pattern image corresponding to and the first pattern light or the second pattern light, which is taken by the camera unit 40, to measure the three-dimensional shape of the measurement object 1.

The control unit 50 includes a main controller 51, a stage controller 52, a grating controller 53, an illuminating unit controller 54 and an image obtaining part 55 for controlling the apparatus for measuring three-dimensional shape by using multi-wavelength.

The main controller 51 controls the stage controller 52, the grating controller 53, the illuminating unit controller 54 and the image obtaining part 55 to measure the three-dimensional shape of the measurement object 1, and the stage controller 52 controls the transfer stage 10. The grating controller 53 controls the grating transferrer 22b of the first projector 20 or the grating transferrer 32b of the second projector 30 to move the first grating 22a or the second grating 32a by a first distance or a second distance, respectively. The illuminating unit controller 54 controls the illuminating unit 21 of the first projector 20 or the illuminating unit 31 of the second projector 30 to turn on/off the illuminating unit 21 or the illuminating unit 31. The image obtaining part 55 treats the first pattern image or the second pattern image taken by the camera unit 40 to send the treated first pattern image or the treated second pattern image to the main controller 51.

Hereinafter, an apparatus for measuring three-dimensional shape by using multi-wavelength according to another exemplary embodiment will be explained referring to FIG. 3a and FIG. 3b.

Figure 3A:
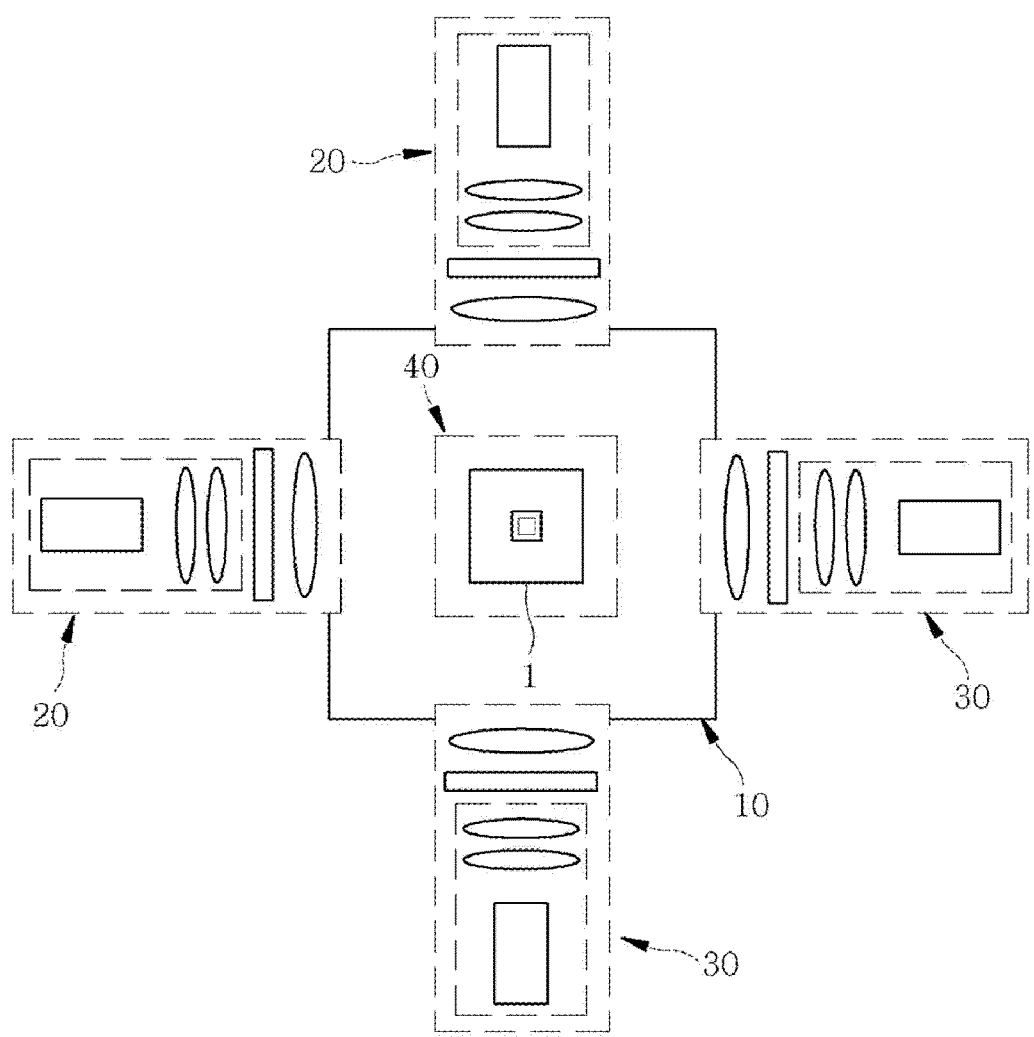
FIG. 3A is a plan view illustrating an apparatus for measuring three-dimensional shape by using multi-wavelengths according to another exemplary embodiment of the present invention.
Figure 3B:
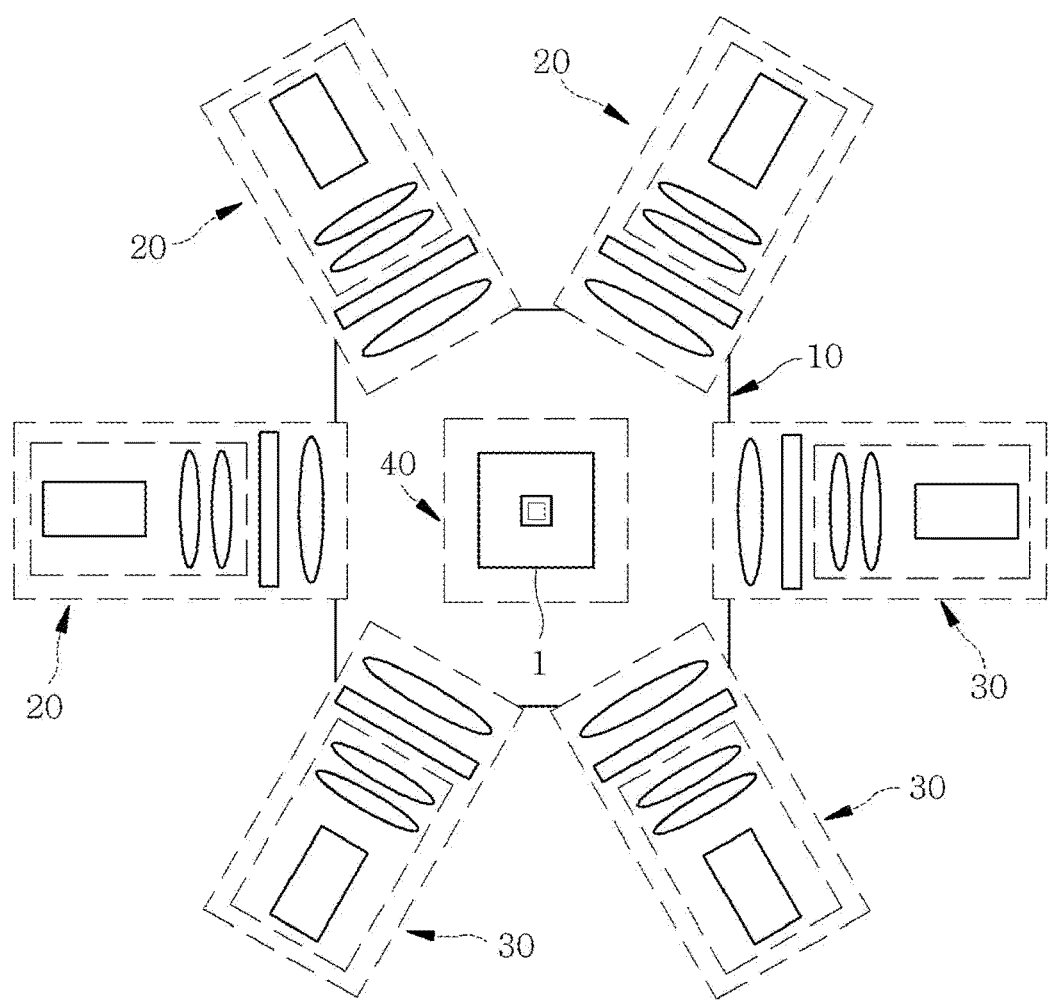
FIG. 3B is a plan view illustrating an apparatus for measuring three-dimensional shape by using multi-wavelength according to still another exemplary embodiment of the present invention.

FIG. 3A is a plan view illustrating an apparatus for measuring three-dimensional shape by using multi-wavelengths according to another exemplary embodiment of the present invention, and FIG. 3B is a plan view illustrating an apparatus for measuring three-dimensional shape by using multi-wavelength according to still another exemplary embodiment of the present invention.

Referring to FIG. 3A and 3B, apparatuses for measuring three-dimensional shape by using multi-wavelength according to another exemplary embodiment and still another exemplary embodiment include a transfer stage 10, a plurality of first projectors 20, a plurality of second projectors 30, a camera unit 40 and a control unit 50, respectively.

The transfer stage 10 transfers a measurement object 1 to a measurement position. The plurality of first projectors 20 is disposed over and to the side of the transfer stage 10, and irradiates the first pattern light with the first equivalent wavelength onto the measurement object 1. The plurality of first projectors 20 is adjacent from one another. The plurality of second projectors 30 is disposed over and to the side of the transfer stage 10 such that the plurality of second projectors 30 is opposite to the plurality of first projectors 20, and irradiates the second pattern light with the second equivalent wavelength that is different from the first equivalent wavelength onto the measurement object 1. The plurality of second projectors 30 is adjacent to one another and opposite to the plurality of first projectors 20. For example, as shown in FIG. 3a and FIG. 3b, when one of the plurality of first projectors 20 irradiates the first pattern light onto the measurement object 1 in a first direction, one of the plurality of second projectors 30, which is opposite to the one of the plurality of first projectors 20, irradiates the second pattern light onto the measurement object 1 in a second direction.

The camera unit 40 is disposed over the transfer stage 10 to take a first pattern image that is generated when the first pattern light is reflected by the measurement object 1 and a second pattern image that is generated when the second pattern light is reflected by the measurement object 1, sequentially. The control unit 50 controls the plurality of first projectors 20 and the plurality of second projectors 30, respectively such that the first pattern lights or the second pattern lights are irradiated onto the measurement object 1i, and the control unit 50 receives a plurality of first pattern images or a plurality of second pattern images corresponding to and the first pattern lights or the second pattern lights, which are taken by the camera unit 40, to measure the three-dimensional shape of the measurement object 1.

Hereinafter, a method for measuring three-dimensional shape by using multi-wavelength according to an exemplary embodiment of the present invention will be explained referring to figures.

Figure 4:
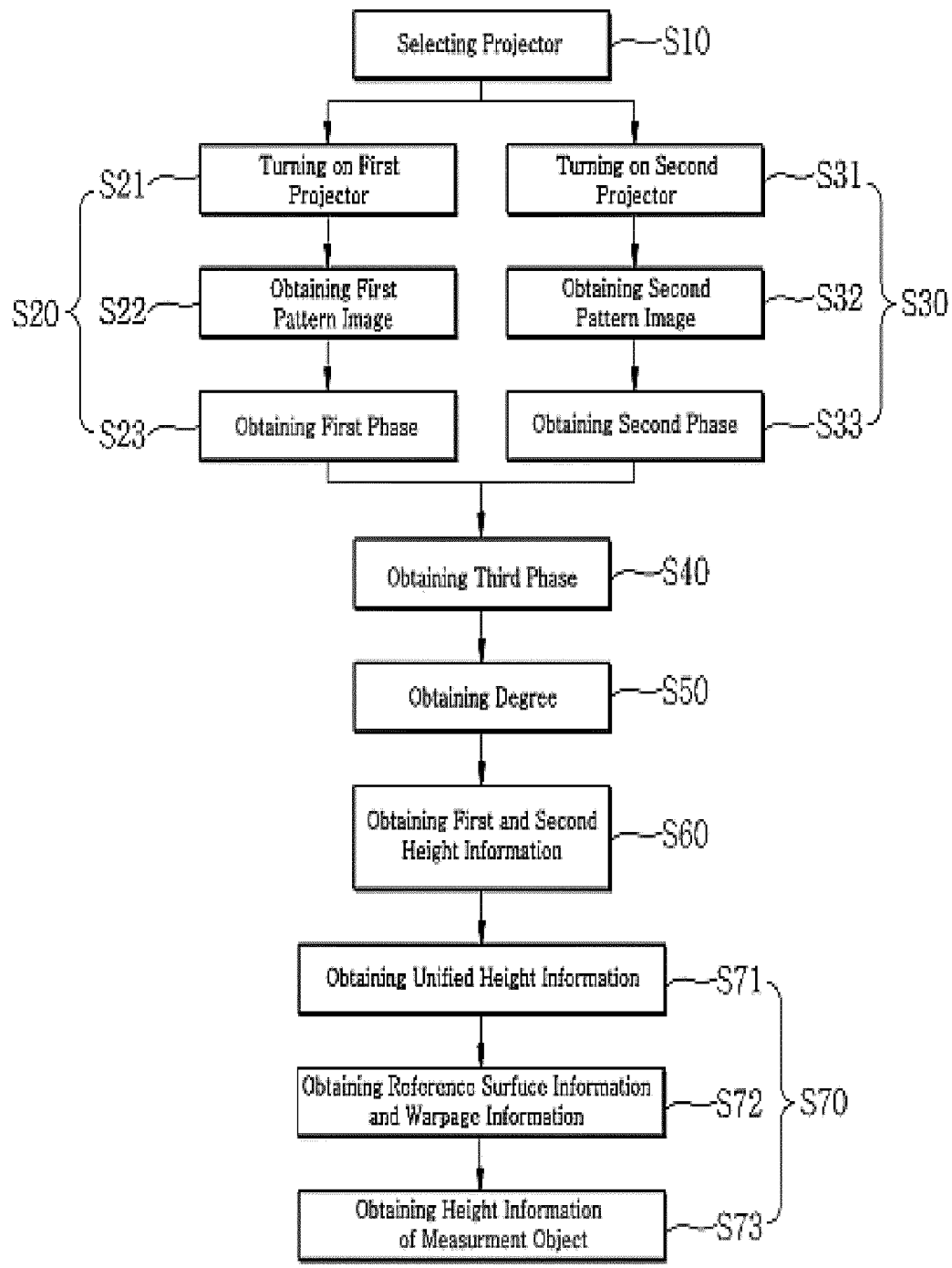
FIG. 4 is a flow chart showing a method for measuring three-dimensional shape by using multi-wavelength according to an exemplary embodiment of the present invention.

FIG. 4 is a flow chart showing a method for measuring three-dimensional shape by using multi-wavelength according to an exemplary embodiment of the present invention.

Referring to FIG. 4, in a method for measuring three-dimensional shape by using multi-wavelength according to an exemplary embodiment of the present invention, when the number of the first projector 20 and the number of the second projector 30 is one as shown in FIG. 2, the first projector 20 or the second projector 30 is selected. However, when the number of the first projector 20 and the number of the second projector 30 is plural as shown in FIG. 3a and FIG. 3b, one of the plurality of first projectors 20 or one of the plurality of second projectors 30 is selected (step S10).

When the first projector 20 is selected, the first pattern light with the first equivalent wavelength is irradiated onto the measurement object 1 in the first direction, moving the first grating of the first projector 20 step by step, and a plurality of first pattern images is obtained to obtain a first phase through the plurality of first pattern images by using the N-bucket algorithm (step S20).

In order to obtain the first phase, the plurality of first projector 20 may be sequentially turned on (step S21). Then, a plurality of first pattern images is obtained, which is formed when the first pattern light having the first equivalent wavelength is irradiated onto the measurement object 1 in the first direction, moving the first grating of one of the plurality of first projectors 20, which is turned on (step S22). When a plurality of first pattern images is obtained, the first phase is obtained through the plurality of first pattern images by using the N-bucket bucket algorithm (step S23).

When the first phase is obtained, the second pattern light with the second equivalent wavelength different from the first equivalent wavelength is irradiated onto the measurement object 1 in the second direction, moving the second grating of the second projector 30 step by step, and a plurality of second pattern images is obtained to obtain a second phase through the plurality of second pattern images by using the N-bucket algorithm (step S30).

In order to obtain the second phase, the plurality of second projector 30 may be sequentially turned on (step S31). Then, a plurality of second pattern images is obtained, which is formed when the second pattern light having the second equivalent wavelength is irradiated onto the measurement object 1 in the second direction, moving the second grating of one of the plurality of second projectors 30, which is turned on (step S32). When a plurality of second pattern images is obtained, the second phase is obtained through the plurality of second pattern images by using the N-bucket bucket algorithm (step S33).

When the first and second phases are obtained, a third phase according to a beat of the first equivalent wavelength and the second equivalent wavelength (step S40). In obtaining the third phase, the expression of $\phi_{12}(x,y)=\phi_1(x,y)-\phi_2(x,y)=2\pi h(x,y)/\lambda_{12}$ is used, wherein $\phi_{12}(x,y)$ is the third phase, $\phi_1(x,y)$ is the first phase, $\phi_2(x,y)$ is the second phase, $h(x,y)$ is height of measurement point, and $\lambda_{12}$ is a beaten equivalent wavelength. The beaten equivalent wavelength $\lambda_{12}$ is obtained to be 3321 μm by using the above expression, when the first equivalent wavelength is 578 μm and the second equivalent wavelength is 713 μm.

Figure 5A:
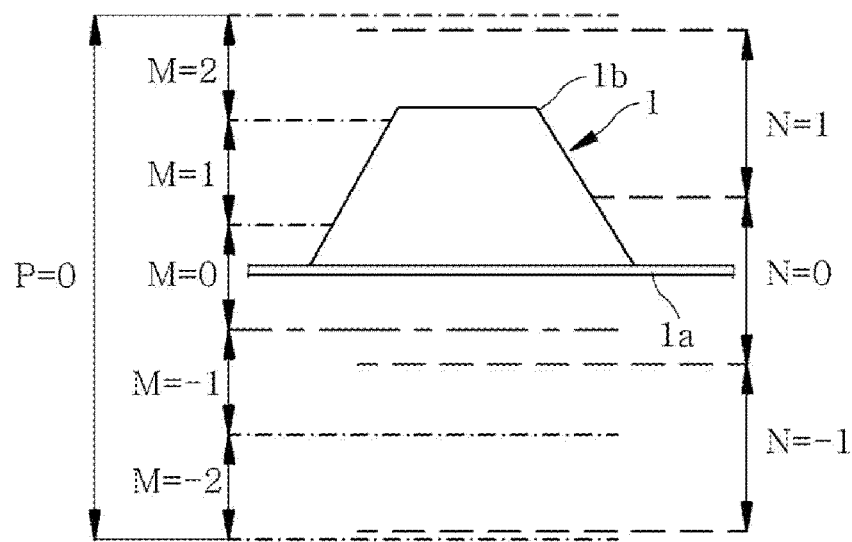
FIGS. 5A, 5B and 5C are diagrams showing a method for measuring three-dimensional shape by using multi-wavelength according to an exemplary embodiment of the present invention.
Figure 5B:
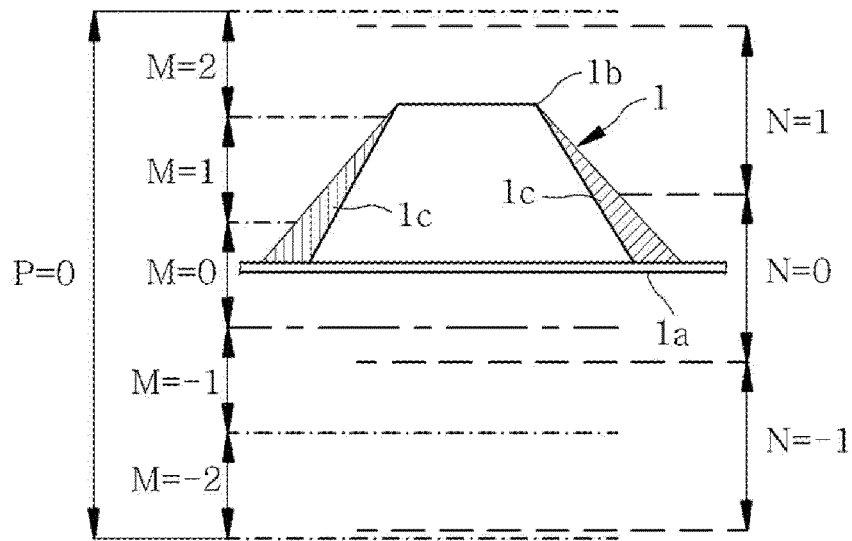

When the third phase is obtained, a first degree of the first phase and a second degree of the second phase are obtained using the third phase (step S50). Here, when the first degree is M and the second degree is N as shown in FIG. 5A and 5B, the first degree M is obtained using an expression of $\phi_1(x,y)=2\pi h/\lambda_1+M\cdot 2\pi$ and the second degree N is obtained using an expression of $\phi_1(x,y)=2\pi h/\lambda_1+N\cdot 2\pi$.

Then, the first and second height information is obtained using the first and second degrees and the first and second phases (step S60). As described above, by obtaining the first and second height information through the first and second phases after the first and second degrees are obtained, the $2\pi$ ambiguity is removed to increase a maximum height of the measurement object, which is capable of being measured. Here, the maximum height is obtained using an expression of $h(x,y)=\phi_{12}(x,y)/2\pi\lambda_{12}$. That is, when a first degree M=−2,−1,0,1,2 of the first equivalent wavelength in P=0th degree of the beaten equivalent wavelength $\lambda_{12}$, and a second degree N=−1,0,1 of the second equivalent wavelength in P=0th degree of the beaten equivalent wavelength $\lambda_{12}$ are obtained as shown in FIGS. 5A and 5B, the $2\pi$ ambiguity according to each degree is removed.

When the first and second height information is obtained, the three-dimensional shape of the measurement object 1 is measured using the first and second degrees and the first and second height information (step S70). In order to measure the three-dimensional shape of the measurement object 1, after a shadow region 1c in FIG. 5B and a noise are removed using the first and second degrees and the first and second height information, unified height information is obtained (step S71).

Figure 5C:
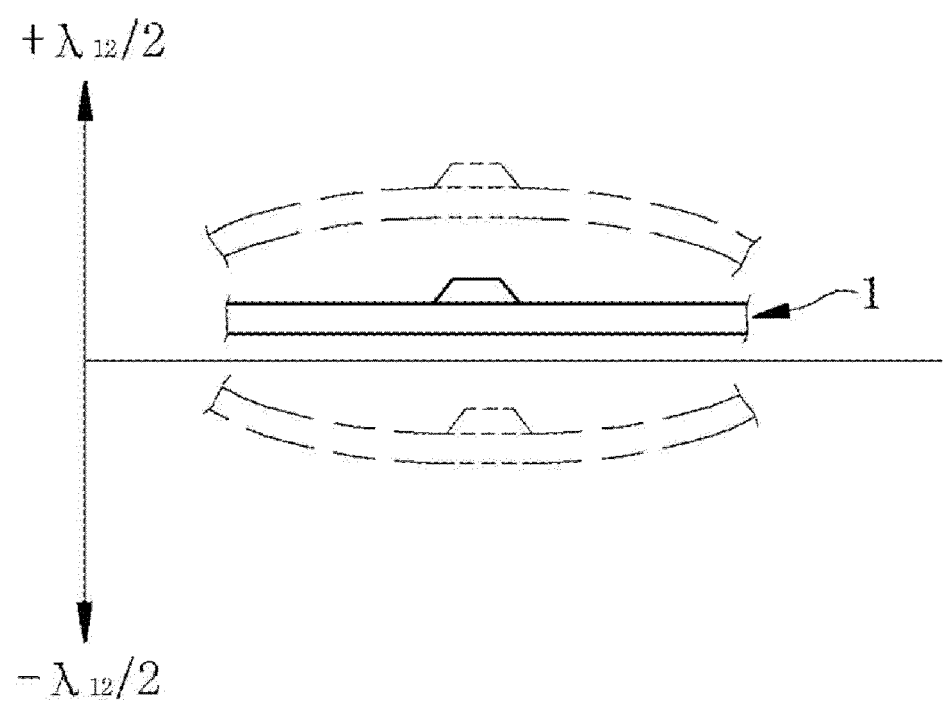

When the unified height information is obtained, the height information of a reference surface of the measurement object 1 is obtained by using the unified height information, and warpage information of the measurement object 1 is obtained using the height information of a reference surface (step S72). That is, by using the beaten equivalent wavelength $\lambda_{12}$, the maximum height capable of being measured, increases so that a height of the measurement object 1 may be measured since the measurement object 1 is in a range of $+\lambda_{12}/2$ to $-\lambda_{12}/2$ even when the measurement object 1 is concavely or convexly curved as shown in a dotted line in FIG. 5C. Therefore, the entire warpage information of the measurement object 1 may be obtained. Hereinbefore, the measurement object 1 is a target portion 1b for measuring the height thereof and a substrate 1a as shown in FIGS. 5A and 5B, and the reference surface is set to be a bottom surface of the substrate 1a.

As described above, when the warpage information and the height information of the reference surface are obtained, the height information of the measurement object 1 is obtained using the warpage information and the height information of the reference surface (step S73). Therefore, the three-dimensional shape of the measurement object 1 is measured.

The apparatus and the method for measuring three-dimensional shape by using multi-wavelength may be applied to measuring three-dimensional shape of a printed circuit board, a solder ball or electronic elements, etc.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus for measuring a three-dimensional shape, comprising:

a transfer stage transferring a measurement object to a measurement position;

a first projector irradiating a first pattern light having a first equivalent wavelength toward the measurement object in a first direction;

a second projector irradiating a second pattern light having a second equivalent wavelength that is different from the first equivalent wavelength toward the measurement object in a second direction;

a camera unit taking a first pattern image that is generated when the first pattern light is reflected by the measurement object, and a second pattern image that is generated when the second pattern light is reflected by the measurement object; and a control unit controlling the first projector and the second projector, and measuring a three-dimensional shape of the measurement object through the first pattern image and the second pattern image, wherein the control unit obtains a first phase and a second phase through the first pattern image and the second pattern image, which are taken by the camera unit, obtains a third phase using the first equivalent wavelength and the second equivalent wavelength, and obtains unified height information by using the first phase, the second phase and the third phase.

2. The apparatus of claim 1, wherein the first projector comprises:

an illuminating unit emitting a light; and a first grating unit transforming the light into the first pattern light having the first equivalent wavelength, the first grating unit comprising a first grating having a plurality of first patterns with a first pitch to transform the light into the first pattern light having the first equivalent wavelength, and a grating transferrer connected to the first grating to transfer the first grating by a first distance.

3. The apparatus of claim 2, wherein the first projector further comprises a condenser lens condensing the first pattern light.

4. The apparatus of claim 2, wherein the first grating unit comprises one of grating plate module, a liquid crystal display and a digital mirror.

5. The apparatus of claim 1, wherein the second projector comprises:

an illuminating unit emitting a light; and a second grating unit transforming the light into the second pattern light having the second equivalent wavelength, the second grating unit comprising a second grating having a plurality of second patterns with a second pitch to transform the light into the second pattern light having the second equivalent wavelength, and a grating transferrer connected to the second grating to transfer the second grating by a second distance.

6. The apparatus of claim 5, wherein the second projector further comprises a condenser lens condensing the second pattern light.

7. The apparatus of claim 5, wherein the second grating unit comprises one of grating plate module, a liquid crystal display and a digital mirror.

8. The apparatus of claim 1, wherein the camera unit comprises:
an image forming lens receiving the first pattern image or the second pattern image to form an image; and
a camera receiving the image formed by the image forming lens, wherein the camera is a CCD camera or a CMOS camera.

9. The apparatus of claim 1, wherein the camera unit further comprises a two-dimensional inspection illuminating unit for two-dimensional inspection of the measurement object, the two-dimensional inspection illuminating unit comprising a plurality of light-emitting diode or a circular lamp.

10. An apparatus for measuring a three-dimensional shape, comprising:
a transfer stage transferring a measurement object to a measurement position;
a plurality of first projectors irradiating a first pattern light having a first equivalent wavelength toward the measurement object, respectively;
a plurality of second projectors irradiating a second pattern light having a second equivalent wavelength that is different from the first equivalent wavelength toward the measurement object, respectively;
a camera unit taking a first pattern image that is generated when the first pattern light is reflected by the measurement object, and a second pattern image that is generated when the second pattern light is reflected by the measurement object; and
a control unit individually controlling the a plurality of first projectors and the plurality of second projectors to irradiate a plurality of first pattern light and a plurality of second pattern light toward the measurement object, and receiving the first pattern image and the second pattern image from the camera unit to measuring a three-dimensional shape of the measurement object,
wherein the control unit obtains a first phase and a second phase through the first pattern image and the second pattern image, which are taken by the camera unit,
obtains a third phase using the first equivalent wavelength and the second equivalent wavelength, and
obtains unified height information by using the first phase, the second phase and the third phase.

11. The apparatus of claim 10, the plurality of first projectors is adjacent to one another.

12. The apparatus of claim 10, the plurality of first projectors is opposite to the plurality of second projectors.

13. A method for measuring a three-dimensional shape, comprising:
obtaining a first phase through a plurality of first pattern images that is generated when a first pattern light having a first equivalent wavelength is reflected by a measurement object, while moving a first grating of a first projector;
obtaining a second phase through a plurality of second pattern images that is generated when a second pattern light having a second equivalent wavelength different from the first equivalent wavelength is reflected by a measurement object, while moving a second grating of a second projector;
obtaining a third phase using the first equivalent wavelength and the second equivalent wavelength; and
obtaining a unified height information by using the first phase, the second phase and third phase.

14. The method of claim 13, wherein the third phase is obtained through a relative difference between the first phase and the second phase.

15. The method of claim 14, further comprising obtaining a first degree of the first phase and a second degree of the second phase by using the third phase.

16. The method of claim 15, further comprising obtaining a first height information and a second height information by using the first and second degrees and the first and second phases.

17. The method of claim 16, wherein obtaining a unified height information is performed after removing a shadow region or a noise by using the first and second degrees and the first and second height information.

18. The method of claim 13, wherein obtaining the first phase, comprises:
turning on the first projector;
obtaining the plurality of first pattern image generated when the first pattern light having the first equivalent wavelength is reflected by the measurement object, while moving the first grating of the first projector; and
obtaining the first phase by using N-bucket algorithm using the plurality of first pattern images.

19. The method of claim 13, wherein obtaining the second phase, comprises:
turning on the second projector;
obtaining the plurality of second pattern image generated when the second pattern light having the second equivalent wavelength is reflected by the measurement object, while moving the second grating of the second projector; and
obtaining the second phase by using N-bucket algorithm using the plurality of second pattern images.

20. The method of claim 13, further comprising:
obtaining height information of reference surface of the measurement object by using the unified height information; and
obtaining warpage information of the measurement object by using the height information of the reference surface of the measurement object.

21. The method of claim 20, further comprising obtaining height information of the measurement object by using the warpage information and the height information of reference surface.

22. The apparatus of claim 1, wherein the control unit obtains height information of a reference surface of the measurement object by using the unified height information, and obtains warpage information of the measurement object by using the height information of the reference surface of the measurement object.

23. The apparatus of claim 1, wherein the control unit obtains height information of a target portion of the measurement object by using the warpage information and the height information of the reference surface.

* * * * *